United States Patent
Bach et al.

(10) Patent No.: US 10,282,435 B2
(45) Date of Patent: May 7, 2019

(54) APPARATUS, METHOD, AND STORAGE MEDIUM FOR AUTOMATICALLY CORRECTING ERRORS IN ELECTRONIC PUBLICATION SYSTEMS

(71) Applicant: International Business Machines Corporation, Armonk, NY (US)

(72) Inventors: Dave Bach, Tucson, AZ (US); Andrew B. Trinh, Tucson, AZ (US); Junfeng Xu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 15/239,474

(22) Filed: Aug. 17, 2016

(65) Prior Publication Data

US 2018/0052871 A1 Feb. 22, 2018

(51) Int. Cl.
*G06F 17/30* (2006.01)
*G06Q 10/10* (2012.01)

(52) U.S. Cl.
CPC .. *G06F 17/30303* (2013.01); *G06F 17/30371* (2013.01); *G06F 17/30769* (2013.01); *G06Q 10/109* (2013.01)

(58) Field of Classification Search
CPC .................................................. G06F 17/27
USPC ............................. 707/724; 706/45; 705/12
See application file for complete search history.

(56) References Cited

U.S. PATENT DOCUMENTS

| | | | |
|---|---|---|---|
| 6,278,772 B1 | 8/2001 | Bowater et al. | |
| 8,244,577 B2 | 8/2012 | Gupta et al. | |
| 2009/0287568 A1 | 11/2009 | Cesmedziev | |
| 2010/0042623 A1 | 2/2010 | Feng et al. | |
| 2010/0268754 A1* | 10/2010 | Holton | G06Q 10/107 709/203 |
| 2011/0078098 A1* | 3/2011 | Lapir | G06F 17/30705 706/12 |
| 2011/0320422 A1 | 12/2011 | Denenberg et al. | |
| 2014/0280453 A1 | 9/2014 | Mattison et al. | |
| 2015/0287047 A1 | 10/2015 | Situ et al. | |
| 2016/0034524 A1 | 2/2016 | Kawecki, III | |

* cited by examiner

*Primary Examiner* — Baoquoc N To
(74) *Attorney, Agent, or Firm* — Kunzler, PC

(57) ABSTRACT

An apparatus that includes: a scanning module that electronically extracts operational details relating to one or more venues from venue data published on one or more electronic publication systems; a query module that provides a query for detecting errors in the extracted operational details using automated contact with a venue representative of the one or more venues; an audio module that communicates to the venue representative an electronically-controlled audio script based on the query, and receives from the venue representative, responses to the audio script; and a correction module that automatically initiates error correction of the operational details in response to errors detected using the responses received from the venue representative.

16 Claims, 5 Drawing Sheets

| Venues 130 |
|---|
| Eating 300 |
| Restaurant 302 |
| Coffee 304 |
| Entertainment 306 |
| Music 308 |
| Live Theatre 310 |
| Movie Theater 312 |
| Sports 313 |
| Individual Service 314 |
| Automotive 316 |
| Beauty 318 |
| Fitness 319 |
| Medical 320 |
| Travel 322 |
| Transportation 324 |
| Lodging 326 |
| Public Service Facilities 328 |
| Commercial Facilities 330 |
| Other venues 332 |

Figure 3A

| Electronic Publication Systems 120 |
|---|
| Individual Website Servers 334 |
| Directory Servers 336 |
| Location-based Services 338 |
| Mapping 340 |
| Geosocial networking 342 |
| Social Networking Sites 344 |
| News Sites 346 |
| Public Safety Systems 348 |
| Mobile Apps 350 |
| Search Engines 352 |
| Other systems 354 |

Figure 3B

| Operational Details 128 |
|---|
| Operation Hours 358 |
| Regular 360 |
| Holiday 362 |
| Emergency 364 |
| Conditional 365 |
| Contact Information 366 |
| Performance Times 368 |
| Item availability 370 |
| Prices 372 |
| Other operational details 373 |

Figure 3C

| Correction Schedule 108 |
|---|
| Calendar-based 375 |
| Periodic 376 |
| Daily 377 |
| Weekly 378 |
| Monthly 379 |
| Custom 380 |
| Holiday 381 |
| Seasonal 382 |
| Event-based 383 / Alerts 384 |
| Emergency 374 |
| Weather 385 |
| Disaster 386 |
| Work action 387 |
| Threat 388 |
| News 389 |
| Social media 390 |
| Other events 391 |

Figure 3D

APPARATUS, METHOD, AND STORAGE MEDIUM FOR AUTOMATICALLY CORRECTING ERRORS IN ELECTRONIC PUBLICATION SYSTEMS

FIELD

The subject matter disclosed herein relates to electronic publication systems and more particularly to apparatuses, methods, and storage medium for automatically correcting errors in electronic publication systems.

BACKGROUND

Electronic publication systems may electronically publish venue data including operational details such as hours, contact information, advertisements, prices, and so forth. Electronic publication systems may include venue-specific websites, general search engines, location-based search engines, social media sites, data stores, and mobile applications.

BRIEF SUMMARY

In one embodiment, an apparatus is disclosed that includes: a scanning module that electronically extracts operational details relating to one or more venues from venue data published on one or more electronic publication systems; a query module that provides a query for detecting errors in the extracted operational details using automated contact with a venue representative of the one or more venues; an audio module that communicates to the venue representative an electronically-controlled audio script based on the query, and receives from the venue representative, responses to the audio script; and a correction module that automatically initiates error correction of the operational details in response to errors detected using the responses received from the venue representative.

In one embodiment, a method is disclosed that includes: electronically extracting operational details for one or more venues, from one or more electronic publication systems; providing a query for detecting errors in the operational details using automated contact with a venue representative of the one or more venues; communicating an electronically-controlled audio script based on the query to receive responses from the venue representative; and automatically initiating error correction of the operational details in response to errors detected using the responses received from the venue representative.

In another embodiment, program product is disclosed that includes a computer readable storage medium that stores code executable by a processor, the executable code comprising code to perform: electronically extracting operational details for one or more venues, from one or more electronic publication systems; providing a query for detecting errors in the operational details using automated contact with a venue representative of the one or more venues; communicating an electronically-controlled audio script based on the query to receive responses from the venue representative; and automatically initiating error correction of the operational details in response to errors detected using the responses received from the venue representative.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which:

FIG. 3A is a schematic block diagram depicting exemplary types of venues for automatic error correction in electronic publication systems;

FIG. 3B is a schematic block diagram depicting exemplary types of electronic publication systems;

FIG. 3C is a schematic block diagram depicting exemplary types of operational details;

FIG. 3D is a schematic block diagram depicting exemplary schedule types for error correction.

DETAILED DESCRIPTION

Figure 1:
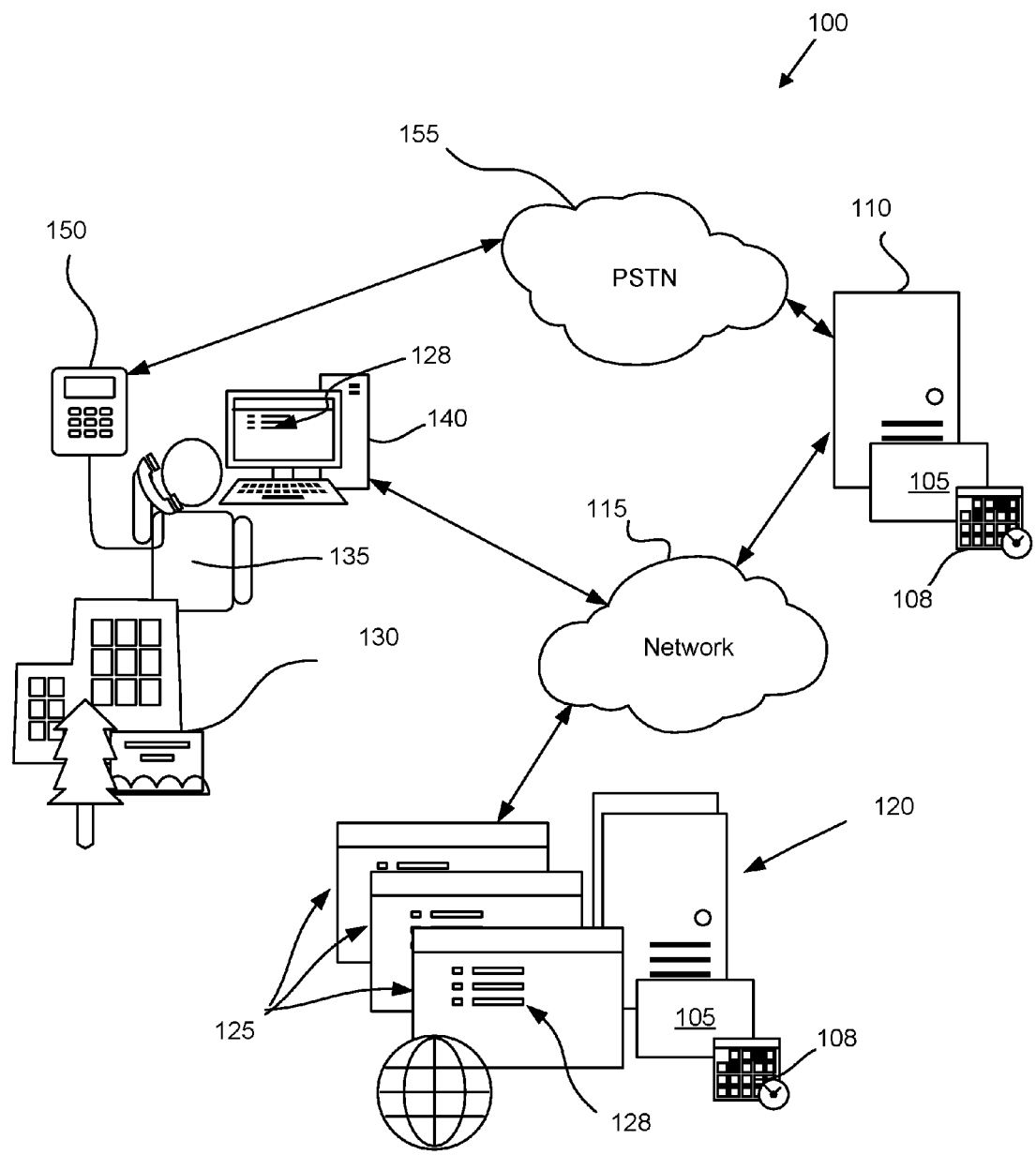
FIG. 1 is a schematic block diagram illustrating one embodiment, of a system that includes an apparatus for automatically correcting venue data errors in electronic publication systems.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly predetermined otherwise. The terms "including," "comprising," "having," and variations thereof mean "including but not limited to" unless expressly predetermined otherwise. An enumerated listing of items does not imply that any or all of the items are mutually exclusive and/or mutually inclusive, unless expressly predetermined otherwise. The terms "a," "an," and "the" also refer to "one or more" unless expressly predetermined otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in particular embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk drive ("HDD"), a solid-state disk drive ("SDD"), a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (such as for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer over any type of network, including a local area network (LAN) or a wide area network (WAN), or the connection may be made to an external computer (for example, over the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts predetermined in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act predetermined in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts predetermined in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the predetermined logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the predetermined functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, and the like, to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Blocks or elements, labelled using singular descriptions may include multiple of the blocks of objects in some embodiments. Similarly, blocks, elements, and/or objects labelled using plural form descriptions do not necessarily include a plurality of blocks, elements, and/or objects in some embodiments. Descriptions of Figures may refer to elements described in previous Figures, like numbers referring to like elements.

FIG. 1 is a schematic block diagram illustrating one embodiment, of a system that includes an apparatus for automatically correcting venue data errors in electronic publication systems. A system 100 includes embodiments of a computing device 110 that includes an error correction apparatus 105. In some embodiments, the computing device 110 connects over network 115 with one or more electronic publication systems 120 that electronically publish venue data 125 relating to one or more venues 130. In some embodiments, the error correction apparatus 105 may communicate audibly over a telephone 150 with a venue representative 135 of the one or more venues 130 via a public switched telephone network ("PSTN") 155. In some embodiments, the error correction apparatus 105 may communicate digitally with the venue representative 135 using a computing device 140 over the network 115.

In some embodiments, the one or more electronic publication systems 120 may be individual electronic publication systems 120 that publish venue data 125 about a single venue 130. The venue data 125 is depicted as screen shots representing the visible interface to the electronic publication systems 120 such as for example, a web page, a data display seen by someone accessing the electronic publication system 120. In some embodiments, the electronic publication systems 120 may include distributed hardware and/or software such as networked servers and applications. In some embodiments, the electronic publication systems 120 include an error correction apparatus 105 integrated into or coupled to the electronic publication systems 120. In other embodiments, the electronic publication systems 120 do not integrate the error correction apparatus 105, rather the error correction apparatus 105 operates on the electronic publication system without it being aware of the error correction apparatus 105.

In some embodiments, a single electronic publication system 120 may publish venue data 125 relating to multiple venues 130. In other embodiments, multiple electronic publication systems 120 may publish multiple items of venue data 125 relating to multiple venues 130. In other words, there may in some circumstances be a one-to-one correspondence between electronic publication systems 120 and venues 130. In other circumstances there may be any number of electronic publication systems 120 publishing venue data 125 about any number of venues 130. The one or more electronic publication systems 120 may be provided with venue data 125 by a venue representative 135 of a venue 130 uploading, pushing, transmitting, editing, and/or sending the venue data 125 to the one or more electronic publication systems 120.

In some embodiments, the venue representative 135 of the one or more venues 130 may be an employee of the venue. In other embodiments, the venue representative 135 of the one or more venues 130 may be a contractor, i.e., a company or individual that has contracted or otherwise agreed with the one or more venues 130 to upload updated venue data 125 as often the venue 130 instructs. A venue representative 135 of the venue 130 such as, for example, an employee, may call another venue representative 135 of the venue such as, for example, a webmaster, to provide instructions regarding the venue data 125.

Sometimes the venue data 125 on the electronic publication system 120 may experience an error in the venue data 125. This may occur for example when an operational detail 128 of the venue changes but the venue data 125 on the electronic publication system is not updated. Some venues 130 may close early or stay open late on a particular day or for a particular period. For example, some venues 130 may close early or alternatively offer extended hours on an election day so that employees may vote. The operational details 128 for the venues 130 on the electronic publication system 120 may be the regular operating hours, in which case the operational details 128 for that election day may be in error.

Some venues 130 may extend hours for particular events. For example, some movie theaters 312 may have midnight showings for particularly highly anticipated movies. Again the venue data 125 may be in error either because the operational details 128 for the midnight showings were not uploaded or because the operational details 128 that were uploaded were in error. For example, an error may be due to a typographical error or a miscommunication.

Even when a venue 130 publishes venue data 125 regarding it operational details 128 at a first electronic publication system 120, one or more second electronic publication systems 120 may not be updated in a timely manner. This may occur for example when the first electronic publication system 120 scans the second electronic publication system 120, but does so infrequently or untimely. The venue representative 135 responsible for uploading the venue data 125 may be unaware of a needed update or may forget to initiate the needed update.

Figure 2A:
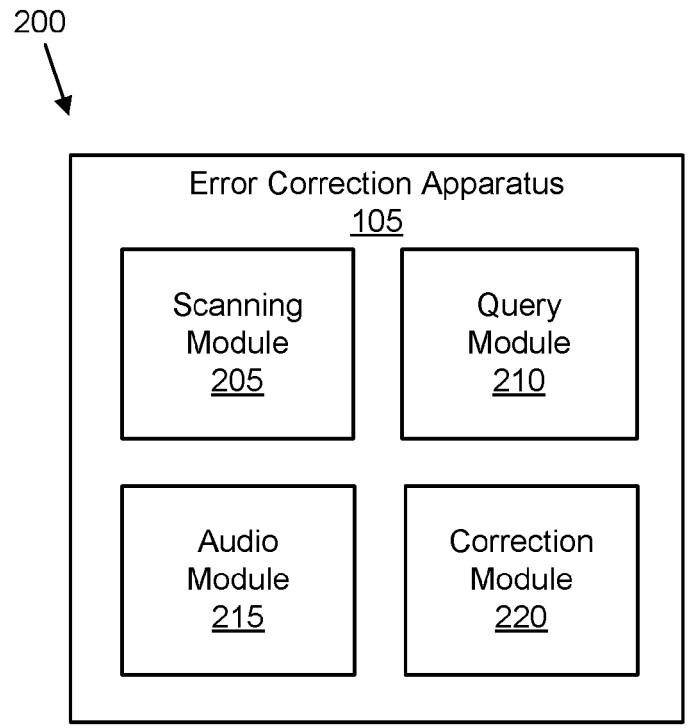
FIG. 2A is a schematic block diagram illustrating one embodiment of an error correction apparatus for electronic publication systems.

FIG. 2A is a schematic block diagram illustrating one embodiment of a system 200 that includes an error correction apparatus 105 for electronic publication systems 120. In one embodiment, the error correction apparatus 105 includes a scanning module 205, a query module 210, an audio module 215, and a correction module 220.

In one embodiment, the scanning module 205 electronically extracts operational details 128 relating to one or more venues 130 from venue data 125 published on one or more electronic publication systems 120. The term "extract" or "extracting" as used herein may refer to retrieving. For example, in some embodiments, the electronic publication systems 120 are individual websites and the scanning module 205 may use web crawling or web scraping techniques to extract operational details 128 from venue data 125 published on the electronic publication systems 120.

In other embodiments, an electronic publication system 120 for the one or more venues 130 may provide an application programming interface ("API") that enables a program to access the venue data 125. For example, some location-based venue publication systems such as Foursquare®, Yelp®, and Google Maps®, have APIs by which a program may extract operational details 128 for thousands of venues 130. Thus, electronically extracting operational details 128 from the published venue data 125 improves the electronic publication systems 120 by enabling automatic detection and correction of errors in operational details 128 of venue data 125.

In one embodiment, the query module 210 provides a query for detecting errors in the extracted operational details 128 using automated contact with a venue representative 135 of the one or more venues 130. In some embodiments, the query comprises one or more textual sentences, such as an introduction sentence, followed by one or more question sentences. For example, in a weather event such as an approaching snow storm, some venues may close early to avoid the problem of venue employees and visitors getting stuck in the snow.

Additionally, by way of example, the venue representative 135 may fail to send updated operational details 128 such as, for example, the early closing time, to the one or more electronic publication systems 120. This may be due to time pressure, unawareness of the existence of the publication systems, forgetfulness, and/or other reasons. An example query for detecting errors in the operational details 128 might include text such as "This is directory service X calling to find out if venue Y plans to close early due to the approaching storm. If yes, say or input the closing time."

In some embodiments, the error correction apparatus 105 includes 215 an audio module 215 that communicates to the venue representative 135 an electronically-controlled audio script based on the query and receives responses to the audio script from the venue representative. The audio module 215 may in some embodiments, connect to and/or include capabilities of an interactive voice response ("IVR") system. In some embodiments, the scanning module 205, query module 210, audio module 215, and/or update module may be implemented at least in part, as cloud-based services, such as, for example, services running on a computing device 110 such as, for example, a server.

In one embodiment, the error correction apparatus 105 may include and/or connect to, interactive voice response system capabilities that include the ability to make outgoing calls to a venue representative 135. An example of an interactive voice response system that can make outgoing calls is WebSphere® Voice Response developed by IBM® and available from Blueworx®. In some embodiments, the electronically-controlled audio script communicated to the venue representative is generated using text-to-speech voice synthesis based, at least in part, on text of the query provided by the query module 210. In some embodiments, the electronically-controlled audio script is communicated using prerecorded phrases and/or questions of a natural person.

In some embodiments, the audio module 215 receives from the venue representative, responses to the audio script. In some embodiments, the audio module 215 may receive telephonic voice responses, telephonic touch-tone responses, short message service responses, email, and combinations thereof. A convenient way for the venue representative to respond to the audio script communicated by phone is by a telephonic voice response. For example, the electronically controlled audio script may play an electronically-controlled audio script that states the operational details 128 such as a closing time for the venue 130 for a particular day, such as, for example, a holiday, a snow day, a grand-opening day, and the like. Other examples of operational details 128 which may be included in the query and the electronically-controlled audio script are described below with respect to FIG. 128.

The audio module 215 may ask the venue representative 135 whether the stated operational details 128 are correct for the particular day. In some embodiments, the venue representative 135 may respond by saying "yes" if the operational details 128 are correct or "no" if the operational details 128 are not correct. In response to a "no" response from the venue representative 135, the audio module 215 may communicate an audio script that says for example, "please say or input the correct hours." The venue representative 135 may then either say the correct closing time, such as, for example "ten" or "ten o'clock." Alternatively, the venue representative may provide a telephonic touch-tone response by pressing the digits "1" and "0" on the keypad of the phone.

In some embodiments, the error correction apparatus 105 includes a correction module 220 that automatically initiates an error correction action for correcting the operational details 128 in response to errors detected using the responses received from the venue representative 135. Examples of errors may include omissions, out-of-date operational details, typographical errors, and so forth, that may be detected by comparing the responses received from the venue representative 135 with the operational details 128 extracted from the venue data 125.

In some embodiments the error correction action may include: remotely correcting the venue data on the one or more electronic publication systems 120 for the one or more venues 130, for example, by remotely accessing the electronic publications systems 120 and correcting the errors. The error correction action may include textually communicating access information for the one or more electronic publication systems 120, for example, communicating the name and web address of the electronic publication system 120. The error correction action may include textually communicating the venue data 125 to be corrected, such as, for example, the operational details 128 that are missing or are otherwise inconsistent with the responses received from the venue representative 135; and/or audibly communicating to the one or more venues, access information for the electronic publication systems, and the venue data to be corrected. For example, audibly communicating may be done using text-to-voice, or playing audio instructions that include prerecorded words and phrases.

Figure 2B:
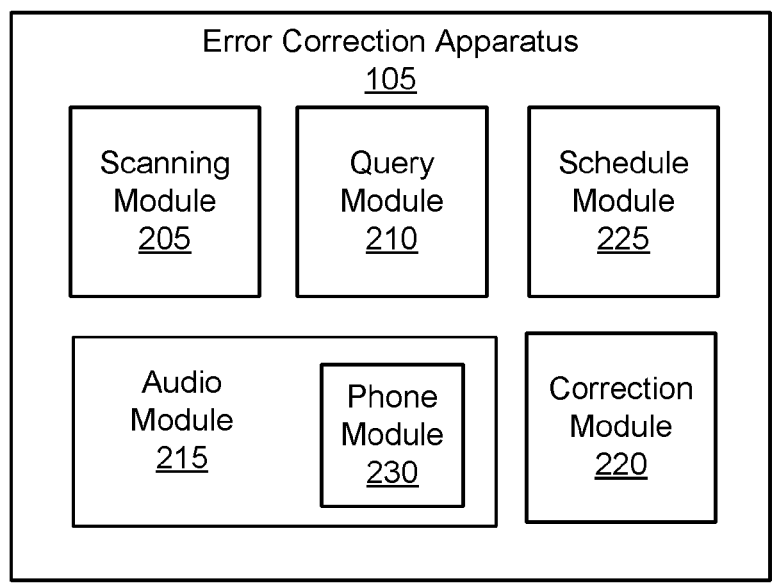
FIG. 2B is a schematic block diagram illustrating another embodiment of an error correction apparatus for electronic publication systems.

FIG. 2B is a schematic block diagram illustrating another embodiment of an error correction apparatus for electronic publication systems. In one embodiment, a system 250 includes an error correction apparatus 105 that includes a scanning module 205, a query module 210, an audio module 215 and/or a correction module 220 that operate substantially as described above with respect to FIG. 2A.

In some embodiments, the system 100 may include an error correction apparatus 105 that further includes a schedule module 225 that determines a correction schedule 108. In some embodiments, the correction schedule 108 includes a schedule for extracting operational details 128 from the one or more electronic publications system 120. In some embodiments, the correction schedule 108 includes a schedule for communicating an electronically controlled audio script based on a query to confirm correctness of the operational details 128 with the one or more venue representatives 135 of the one or more venues 130. In some embodiments, the schedule module 225 further, modifies the correction schedule 108 in response to an alert. More details about exemplary types of correction schedules 108 that may be determined by the schedule module 225 are described below with respect to FIG. 3D.

Providing a correction schedule 108 for automatically correcting errors in venue data 125 improves the error correction apparatus 105 and the electronic publication systems 120 by enabling the electronic publication systems 120 for automatically correcting erroneous venue data 125 in a timely manner. More details related to correction schedule 108 are provided below with respect to FIG. 3D.

In some embodiments, system 100 may include an error correction apparatus 105 that includes audio module 215 that further includes a phone module 230 that automatically establishes telephonic contact with the venue representative 135 to communicate the electronically-controlled audio script and receive responses to the query. The phone module 230 may include an intelligent auto-dialer that automatically dials one or more of the venues 130 to establish contact with the venue representative 135.

In some embodiments, the phone module 230 has an ability to track the status of a particular phone number dialed at particular dates and times. The status may reflect a busy signal, no-answer, or an automated answer. For example, the phone module 230 may track times when the particular phone number dialed results in a busy signal. In some embodiments, the phone module 230 automatically dials phone numbers according to the correction schedule 108 determined by the schedule module 225. Thus, the error correction apparatus 105 improves the electronic publication systems 120 by automatically detecting and correcting errors in the operational details 128 at a predetermined schedule or in response to predetermined types of alerts or events.

FIGS. 3A, 3B, 3C, and 3D provide examples intended to illustrate but not limit the types of venues 130, electronic publication systems 120, operational details 128 for venues 130, and/or correction schedules 108 that may be used by the error correction apparatus 105 and/or the methods 400 and 500 which will be described below with respect to FIG. 4 and FIG. 5.

FIG. 3A is a schematic block diagram depicting exemplary types of venues for automatic error correction in electronic publication systems. As used herein, the term "venue" may refer generally to a locale that provides services and/or goods of particular types at particular times. In some embodiments, the venues 130 may include eating venues 300 such as, for example, restaurants 302 or coffee shops 304. The venues 130 may include places of entertainment venues 306, such as, for example, music venues 308 including for example music halls, amphitheaters, clubs, stadiums, and so forth. The venues 130 may also include live theatre 310 for plays, operas, and the like. The entertainment venues 306 may also include sports venues 313 such as ballparks, arenas, fields, stadiums, sport centers, and so forth.

The venues 130 may further include individual service venues 314. For example, automotive shops 316, beauty salons 318, fitness centers 319, and/or medical offices 320. The venues 130 may also include travel venues 322 that provide travel related services such as transportation services include airlines, bus lines, trains, and the like. Similarly, travel venues 322 may include lodging 326, such as hotel, motels, bed and breakfast inns, hostels, and the like. The venues 130 may also include public service facilities 328 such as government offices, clinics, and the like. The venues may also include commercial facilities 330 such as retail stores, wholesale vendors, commercial service providers, and so forth. In some embodiments, the venues 130 may include other venues 332 including a wide variety of diverse types of venues such as parks, meal delivery services, stores, schools, insurance agencies, churches, community centers, laundries, and the like.

FIG. 3B is a schematic block diagram depicting exemplary types of electronic publication systems. As used herein, electronic publication systems 120 may refer to publication systems that are accessible electronically using a computing device 110. Examples of electronic publications systems may include for example: a smart phone, personal computer, electronic guide, electronic directory and so forth. In some embodiments, the electronic publication systems 120 may include one or more of individual website servers 334, directory servers 336, location-based services 338, mapping system 340, geosocial networking 342, social networking 344, news publishers 346, public safety 348, mobile apps 350, search providers 352, and/or other systems 354.

For example, Google Maps® is a mapping system 340 that also publishes operational details 128 of venue data 125 for one or more venues 130. A passenger in a moving vehicle may search in mapping system 340 such as Google Maps® a for the nearest hardware store. In response the mapping system 340 may provide venue data with a message that says "the nearest hardware store is 5.2 kilometers away but it may be closed by the time you arrive."

FIG. 3C is a schematic block diagram depicting exemplary types of operational details. In some embodiments, the electronic publication systems 120 may publish operational details 128 for the one or more venues 130. For example, in some embodiments, the operational details 128 may include operational details 128, operation hours 358, regular hours 360, holiday hours 362, emergency hours 364, conditional hours 365, contact information 366, performance times 368, availability 370 of items and/or services, prices 372, and/or other operational details 373. Conditional hours 365 may be conditional on an event-based schedule 383 or in response to alerts 384.

For example, in some embodiments, city pools may have conditional hours 365 where the city extends operating hours in response to a code red heat alert. In other embodiments, the city pool may have conditional hours based on temperature or number of visitors forecast. Even if the official city pool website publishes the extended hours, other electronic publication systems including other websites, directories, mapping systems, and the like, may have errors in the operational details 128 of the venue data 125 they publish for the pools. In some embodiments, the error correction apparatus 105 detects and corrects errors in the operational details 128 of venue data 125 in response to an alert 384.

FIG. 3D is a schematic block diagram depicting exemplary schedule types for error correction. In some embodiments, the correction schedule 108 may be calendar-based schedules 375 such as periodic 376, daily 377, weekly 378, and/or monthly 379 schedules. In some embodiments, the correction schedule may be a custom 380 schedule that is configurable to a desired repeating or non-repeating schedule. The correction schedule 108 may include holiday schedules 381, seasonal schedules 382, event-based schedules 383, and/or alert 384 based schedules.

The alert 384 based schedules may be determined for example based on weather alerts 385, disaster alerts 386, for example, due to flooding, earthquakes, and the like. The alert 383 based schedules may also include work action alerts 387 threat alerts 388, news alerts 389, social media alerts 390, and other event alerts 391. The term "alert" as used herein may generally refer to an announcement, message, or news of an event provided with short notice, that may be an unplanned event. Other types of event-based schedules 383 may be based on planned or forecasted events. Some venues may change operational details 128 in response to both planned and unplanned events.

For example, emergencies 374 and disasters 386 are typically unplanned, but a venue 130 such as a commercial facility 330 may plan for operational details such as availability 370 and/or prices 372 of air conditioners based on weather 385 such as forecast hot weather. However, alert 384 for extremely hot weather 385 may increase demand such that venue data 125 regarding availability 370 and/or prices 372 of air conditioners are in error on one or more electronic publication systems 120. Thus, the error correction apparatus 10 5 may improve the electronic publication systems 120 by automatically correcting the venue data errors based on an alert 384 for weather 385, and other alerts and events such as those depicted in FIG. 3D.

Figure 4:
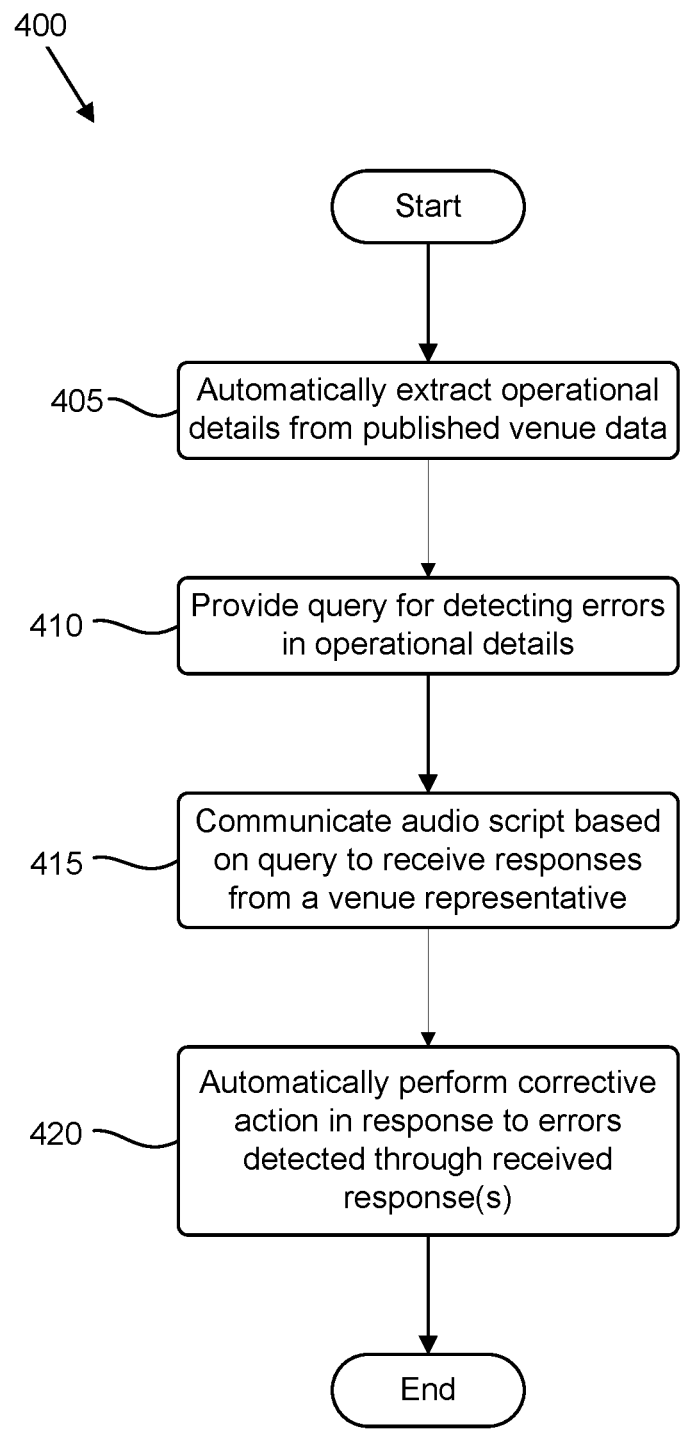
FIG. 4 is a flow chart diagram illustrating one embodiment, of a method for automatically correcting venue data errors in electronic publication systems.

FIG. 4 is a flow chart diagram illustrating one embodiment, of a method for automatically correcting venue data errors in electronic publication systems. In one embodiment, the method 400 includes electronically extracting 405 operational details relating to for one or more venues 130 from published venue data 125 on one or more electronic publication systems 120. For example, the electronically extracting 405 may include accessing the electronic publication systems 120 by an application programming interface ("API"), webscraping or webcrawling, creating a search alert using keywords associated with the one or more venues 130, and/or accessing venue data 125 via reading computer readable media.

In some embodiments, the operational details 128 may include operation hours 358 such as regular hours 360, holiday hours 362, emergency hours 364, conditional hours 365, contact information 366, performance times 368, item availability 370, prices 372, and other operational details 373. In one example, the operational details extracted may be performance times 368, and item availability 370, for example, a number of tickets available.

As one example, the method 400 may be performed using an error correction apparatus 105. The error correction apparatus 105 may be operated by an entity hired by a movie studio is to ensure that venue data 125 including operational details 128 for an upcoming premier of a new movie is correct. The method 400 may electronically extract 405 operational details from published venue data 125 related to the new movie from electronic publication systems 120 such as Foursquare®, Yelp®, and Google® using techniques such as those described above, and/or other techniques known in the field.

The method 400 further includes providing 410 a query for detecting errors in the operational details 128 using automated contact with a venue representative 135 of the one or more venues 130. In some embodiments, the query may be simple such as "what time do you close today?" In some embodiments, the query may include introductory phrases that identify the entity making the query and explain that the purpose of the query is to correct any errors in venue data on a particular electronic publication system 120.

For example, if the electronic publication system Foursquare® publishes venue data 125 for movie theaters 312 and the operational details 128 of interest are performance times 368 on opening night of a highly anticipated new movie, an omission of an extra added performance to accommodate would-be moviegoers may be considered an error. The method 400 may provide 410 a query such as "This is the automated show time updating service calling to find out what times the new movie will be showing at your theater on opening night this Friday. Please input or say the times." The query may further ask about the number of tickets available, the prices, and the like.

Having provided 410 a query, the method 400 further includes communicating 415 an electronically-controlled audio script based on the query to receive responses from the venue representative 135. For example, an electronically-controlled audio script based on the query may be communicated telephonically by an interactive voice response system, to the venue representative 135. Continuing the example, the venue representative 135 may respond by saying, or inputting by touch-tone keypad, the performance times 368 for the new movie at the movie theater 312. The method 400 may then compare at 430 the responses with the extracted venue data 125. If the extracted data did not match the response received to the electronically controlled audio script, for example, because the extracted data omitted a performance time 368 or the price of tickets were in error due to higher or lower pricing in conjunction with the opening night, the method may detect the error.

The method 400 further includes automatically performing 420 an error correction action for correcting the operational details in response to errors detected using the responses received from the venue representative. In some embodiments, the error correction action may include remotely correcting the venue data 125 on the one or more electronic publication systems 120 for the one or more venues 130. For example, the error correction action may include remotely accessing Foursquare and correcting the errors in the venue data 125 using a Foursquare API to edit errors in the performance times 368 and/or the prices 372.

In some embodiments, it may be inconvenient or otherwise difficult to directly correct errors in the venue data 125. The error correction actions may still be initiated, for example by textually communicating to the one or more venues access information such as, for example, a web address for Foursquare® and/or other electronic publication system 120, and the venue data 125 to be corrected. In some embodiments, textually communicating may be by email, online interaction, and/or messaging service. In some embodiments, the error correction action may include audibly communicating to the one or more venues 130, access information for the electronic publication systems 120 such as, for example, the names of the systems and how to access them. The error correction action may also include communicating the venue data 125 to be corrected such as for example, the performance times 368 and the prices 372 of tickets.

It may be understood that the examples provided with respect to FIG. 4 and with respect to other Figures are merely examples and the claimed methods may be applied to a wide range of the venues 130, the electronic publications source 120, the operational details 128, and the schedules 108.

Figure 5:
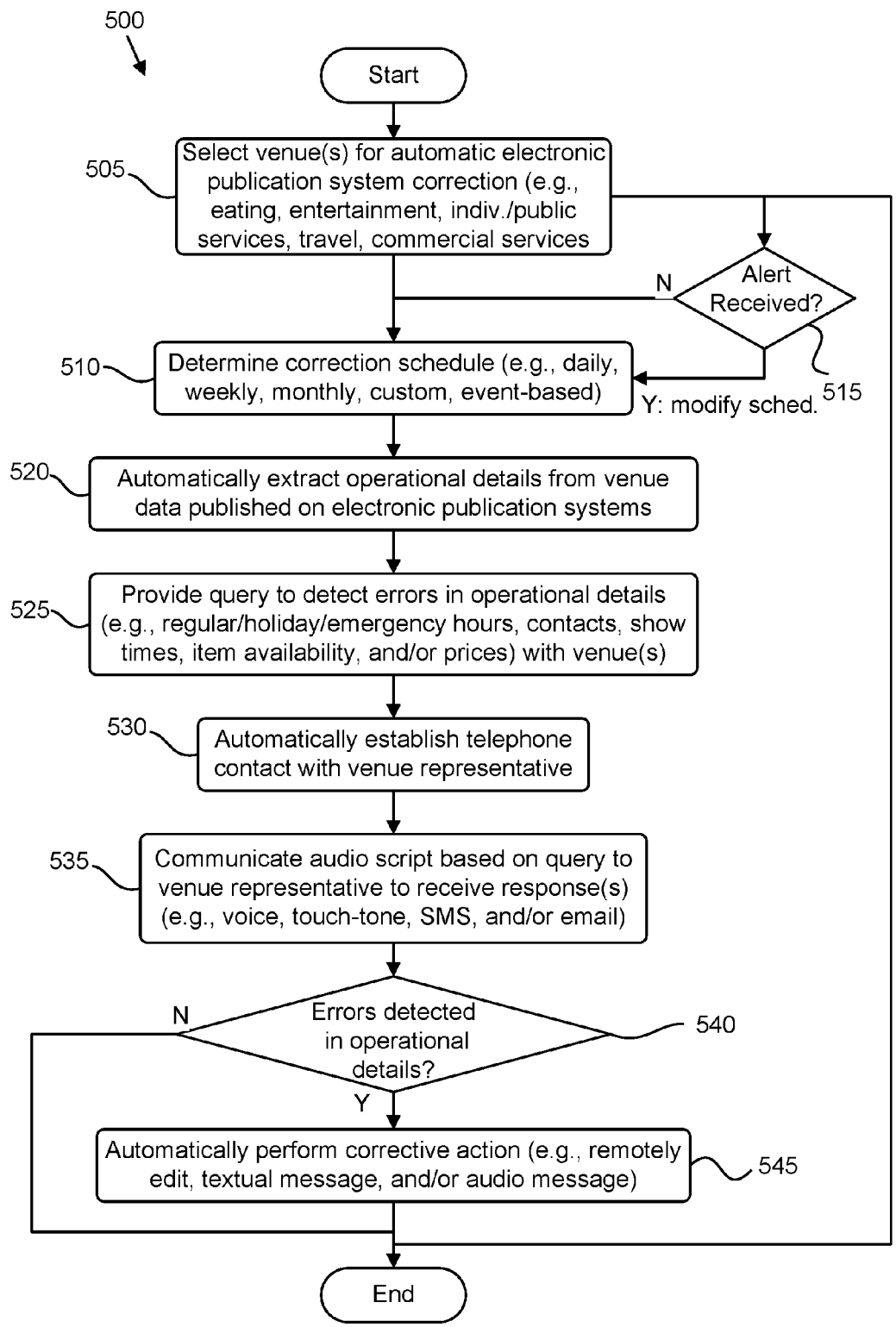
FIG. 5 is a flow chart diagram illustrating another embodiment of a method for automatically correcting venue data errors in electronic publication systems.

FIG. 5 is a flow chart diagram illustrating another embodiment of a method for automatically correcting venue data errors in electronic publication systems. In one embodiment, the method 500 corresponds substantially with the method 400 depicted in FIG. 4. The method 500 may further include selecting 505 one or more venues 130 for electronic publication system correction. The one or more venues 130 may include any venue including but not limited to those shown in FIG. 3A.

In some embodiments, the method includes determining 510 a correction schedule 108 for electronically extracting 520 operational details 128 from venue data 125 published on the one or more electronic publication systems 120 that have been selected 505. The correction schedule 108 may include any schedule type such as shown in FIG. 3D. In some embodiments, the method 500 further includes checking 515 for alerts received, in which case, a correction schedule 108 may be modified in response to the alert as described above with respect to FIGS. 2B, 3A, 3B, 3C, and 3D.

The method 500 may include electronically extracting 520 operational details 128 from venue data 125 published on the one or more electronic publication systems 120 as described above. The method 500 may further include providing 525 a query for detecting errors in the operational details 128 using automated contact with a venue representative 135 of the one or more venues. In some embodiments, the method 500 may further include automatically establishing 530 telephone contact with the venue representative 135. The automatically establishing 530 telephone contact may be done substantially as described above with respect to phone module 230 depicted in FIG. 2B.

In some embodiments, the method 500 may further include communicating 535 an electronically-controlled audio script based on the query to the venue representative 135 to receive responses to the electronically controlled audio script. In some embodiments, the method 500 may further include checking 540 whether errors are detected in the operational details 128 by comparing the operational details with the responses received to the electronically-controlled audio script.

In response to no detected errors, the method 500 ends. In response to errors detected using the responses received from the venue representative 135, the method 500 includes performing an error correction action 545 for correcting the operational details. After which, the method 500 ends.

Thus, the embodiments of the apparatus, method, and storage medium described above and shown in the Figures, significantly improve electronic publication technology by providing electronic publication systems 120 with apparatuses and methods, and storage medium for automatically correcting venue data errors, an in particular for correcting errors in operational details 128.

What is claimed is:

1. An apparatus comprising:
a scanning module that electronically extracts operational details relating to one or more venues from venue data published on one or more electronic publication systems, each of the one or more venues providing one or more of goods and services at predetermined times and at a predetermined geographical location;
a schedule module that determines a schedule for the apparatus in response to one or more of an electronically communicated alert and an electronically communicated event at the one or more predetermined locales that impact conditional operating times of the one or more venues;
a query module that generates a query for detecting errors in the extracted operational details using automated contact with a venue representative of the one or more venues, wherein the errors comprise differences between the predetermined times at the one or more predetermined locales in the published venue data and the operating times impacted by the one or more of the electronically communicated alert and the electronically communicated event;
an audio module that communicates to the venue representative an electronically-controlled audio script based on the query and receives from the venue representative responses to the audio script; and
a correction module that automatically initiates error correction of the operational details in response to errors detected using the responses to the audio script received from the venue representative,
wherein at least a portion of said modules comprise one or more of hardware circuits, programmable hardware devices, and a processor executing executable code.

2. The apparatus of claim 1, wherein the scanning module further selects the one or more venues from the group consisting of eating venues, entertainment venues, individual service venues, travel venues, public service facilities, commercial facilities, and combinations thereof.

3. The apparatus of claim 1, wherein the alert is selected from the group consisting of weather alerts, disaster alerts, work action alerts, threat alerts, news alerts, social media alerts, and combinations thereof.

4. The apparatus of claim 3, wherein the extracted operational details are selected from the group consisting of regular hours, holiday hours, emergency hours, conditional hours, contact information, performance times, item availability, prices, and combinations thereof.

5. The apparatus of claim 4, where the audio module further comprises a phone module that automatically establishes telephonic contact with the venue representative to communicate the electronically-controlled audio script and receive responses to the query.

6. The apparatus of claim 5, wherein responses processed by the audio module are selected from the group consisting of telephonic voice responses, telephonic touch-tone responses, messaging service responses, email, and combinations thereof.

7. The apparatus of claim 6, wherein the error correction action performed by the correction module is selected from the group consisting of:
remotely correcting the venue data on the one or more electronic publication systems for the one or more venues;
textually communicating access information for the one or more electronic publication systems and textually communicating the venue data to be corrected; and
audibly communicating to the one or more venues, access information for the electronic publication systems, and the venue data to be corrected.

8. A method comprising:
electronically extracting operational details for one or more venues, from one or more electronic publication systems, each of the one or more venues providing one or more of goods and services at predetermined times and at a predetermined geographical location;
determining a schedule for correcting the operational details in response to one or more of an electronically communicated alert and an electronically communicated event at the one or more predetermined locales that impact conditional operating times of the one or more venues;

generating a query for detecting errors in the operational details using automated contact with a venue representative of the one or more venues, wherein the errors comprise differences between the predetermined times at the one or more predetermined locales in the published venue data and the operating times impacted by the one or more of the electronically communicated alert and the electronically communicated event;

communicating an electronically-controlled audio script based on the query to receive responses from the venue representative; and automatically initiating error correction of the operational details in response to errors detected using the responses to the audio script received from the venue representative.

9. The method of claim 8, wherein the one or more venues are selected from the group consisting of eating venues, entertainment venues, individual service venues, travel venues, public service facilities, commercial facilities, and combinations thereof.

10. The method of claim 8, wherein the alert is selected from the group consisting of weather alerts, disaster alerts, work action alerts, threat alerts, news alerts, social media alerts, and combinations thereof.

11. The method of claim 10, wherein the operational details are selected from the group consisting of regular hours, holiday hours, emergency hours, conditional hours, contact information, performance times, item availability, prices, and combinations thereof.

12. The method of claim 11 further comprising, automatically establishing telephonic contact with the venue representative to communicate the electronically-controlled audio script and receive responses to the query.

13. The method of claim 12, wherein responses received are selected from the group consisting of telephonic voice responses, telephonic touch-tone responses, messaging service responses, email, and combinations thereof.

14. The method of claim 13, wherein the error correction action is selected from the group consisting of:
remotely correcting the venue data on the one or more electronic publication systems for the one or more venues;
textually communicating to the one or more venues, access information for the electronic publication systems, and the venue data to be corrected; and
audibly communicating to the one or more venues, access information for the electronic publication systems, and the venue data to be corrected.

15. A program product comprising a computer readable storage medium that stores code executable by a processor, the executable code comprising code to perform:
electronically extracting operational details for one or more venues, from one or more electronic publication systems, each of the one or more venues providing one or more of goods and services at predetermined times and at a predetermined geographical location;
determining a schedule for correcting the operational details in response to one or more of an electronically communicated alert and an electronically communicated event at the one or more predetermined locales that impact conditional operating times of the one or more venues;
generating a query for detecting errors in the operational details using automated contact with a venue representative of the one or more venues, wherein the errors comprise differences between the predetermined times at the one or more predetermined locales in the published venue data and the operating times impacted by the one or more of the electronically communicated alert and the electronically communicated event;
communicating an electronically-controlled audio script based on the query to receive responses from the venue representative; and
automatically initiating error correction of the operational details in response to errors detected using the responses to the audio script received from the venue representative.

16. The program product of claim 15, wherein the error correction action is selected from the group consisting of:
remotely correcting the venue data on the one or more electronic publication systems for the one or more venues;
textually communicating to the one or more venues, access information for the electronic publication systems, and the venue data to be corrected; and
audibly communicating to the one or more venues, access information for the electronic publication systems, and the venue data to be corrected.

* * * * *